United States Patent
Friel, Sr. et al.

[11] Patent Number: 6,012,971
[45] Date of Patent: Jan. 11, 2000

[54] SHARPENING APPARATUS

[75] Inventors: Daniel D. Friel, Sr., Greenville, Del.; Daniel D. Friel, Jr., Kennett Square, Pa.; Robert P. Bigliano, Wilmington, Del.

[73] Assignee: Edgecraft Corporation, Avondale, Pa.

[21] Appl. No.: 09/039,128

[22] Filed: Mar. 13, 1998

Related U.S. Application Data

[60] Provisional application No. 60/040,766, Mar. 14, 1997.

[51] Int. Cl.⁷ ........................................ B24B 1/00
[52] U.S. Cl. ................... 451/45; 51/298; 51/295; 451/282; 451/293; 451/541; 451/548
[58] Field of Search .................. 451/45, 57, 58, 451/65, 178, 185, 193, 192, 262, 263, 267, 282, 293, 321, 322, 349, 548, 541; 51/295, 298

[56] References Cited

U.S. PATENT DOCUMENTS

| | | |
|---|---|---|
| 1,172,860 | 2/1916 | Aschburner . |
| 2,841,926 | 7/1958 | Lebus . |
| 3,332,173 | 7/1967 | McMaster et al. . |
| 4,128,972 | 12/1978 | Charvat . |
| 4,504,283 | 3/1985 | Charvat . |
| 4,716,689 | 1/1988 | Friel . |
| 4,807,399 | 2/1989 | Friel . |
| 4,915,709 | 4/1990 | Andrew et al. . |
| 5,005,319 | 4/1991 | Friel ........................................ 451/45 X |
| 5,018,310 | 5/1991 | Fierus et al. . |
| 5,245,791 | 9/1993 | Bigliano et al. . |
| 5,390,431 | 2/1995 | Friel .......................................... 451/45 |
| 5,582,535 | 12/1996 | Friel .......................................... 451/45 |
| 5,611,726 | 3/1997 | Friel et al. ............................... 451/177 |

FOREIGN PATENT DOCUMENTS 0 417 004  3/1991  European Pat. Off. .

*Primary Examiner*—Timothy V. Eley
*Attorney, Agent, or Firm*—Connolly Bove Lodge & Hutz

[57] ABSTRACT

An abrasive material contains abrasive particles in the range of 50 to 80% by weight in an olefinic thermalplastic resin system which is based on ethylene copolymer. The material may be incorporated on a substrate structure to be used as a stropping or honing material or may be shaped by an injection molding process or may be injection molded over a rigid insert or molded over a rigid wheel or disk inserted in the mold. The material may be used for polishing and finishing of crystalline materials, ceramics, silicon and semiconductor wafers.

16 Claims, 8 Drawing Sheets

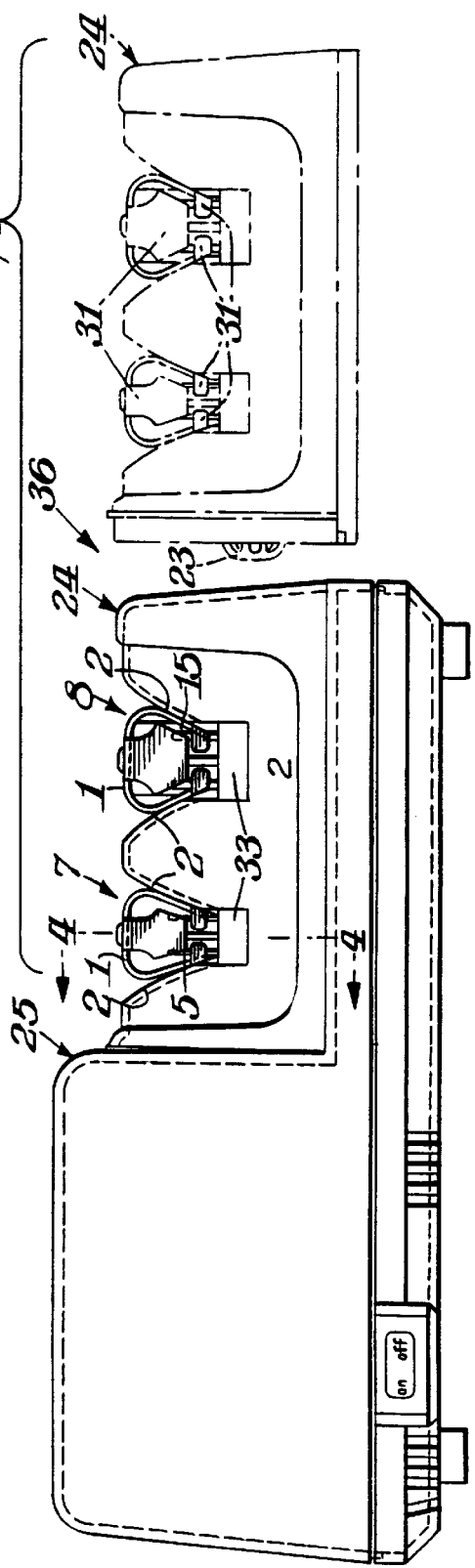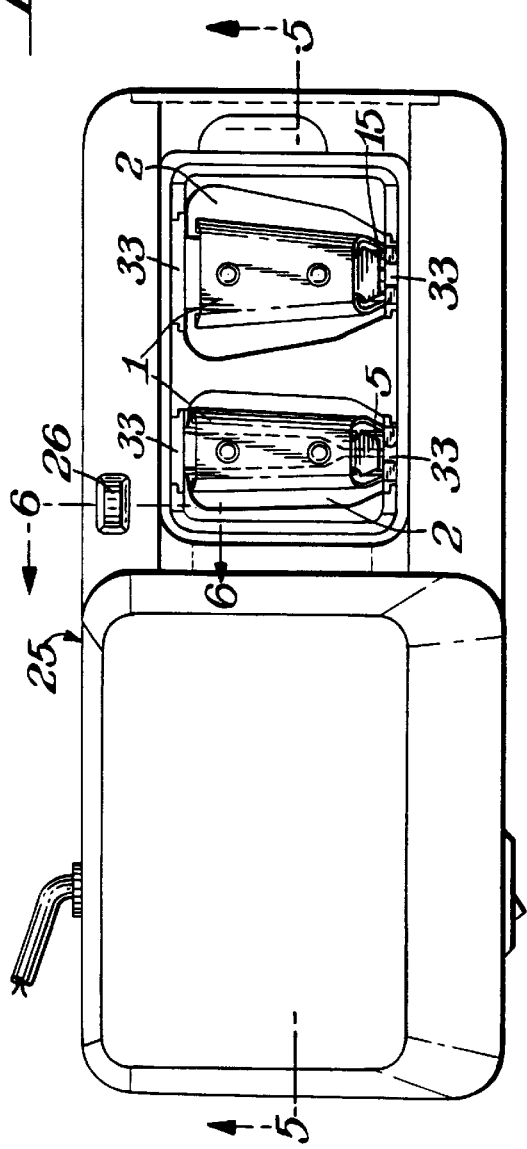

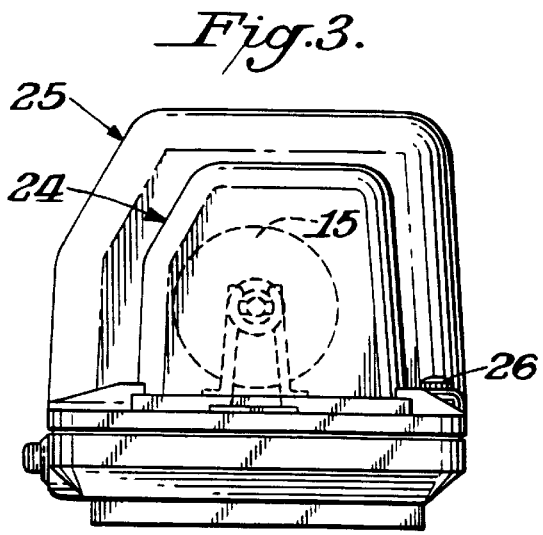
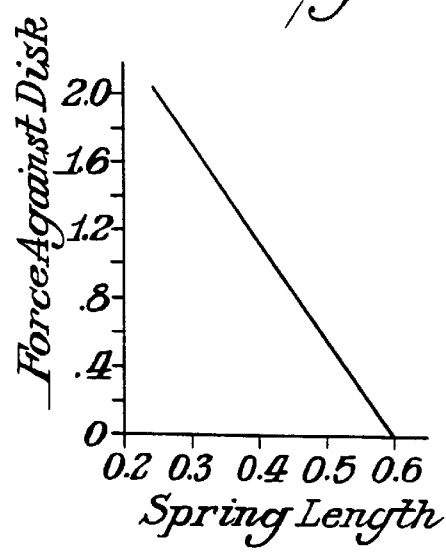
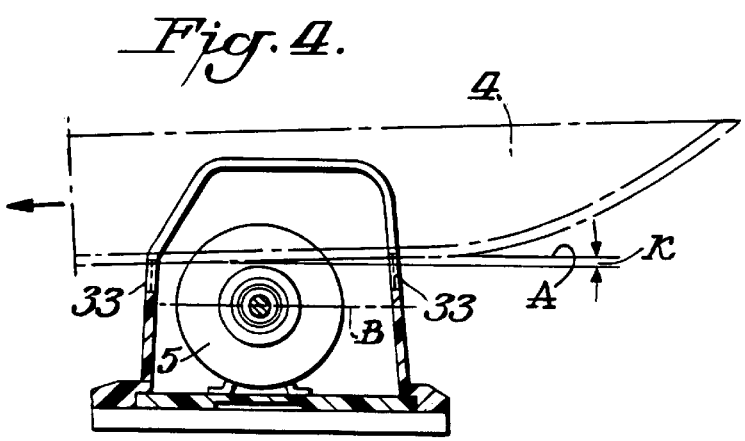
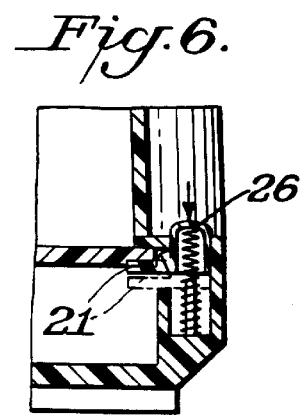
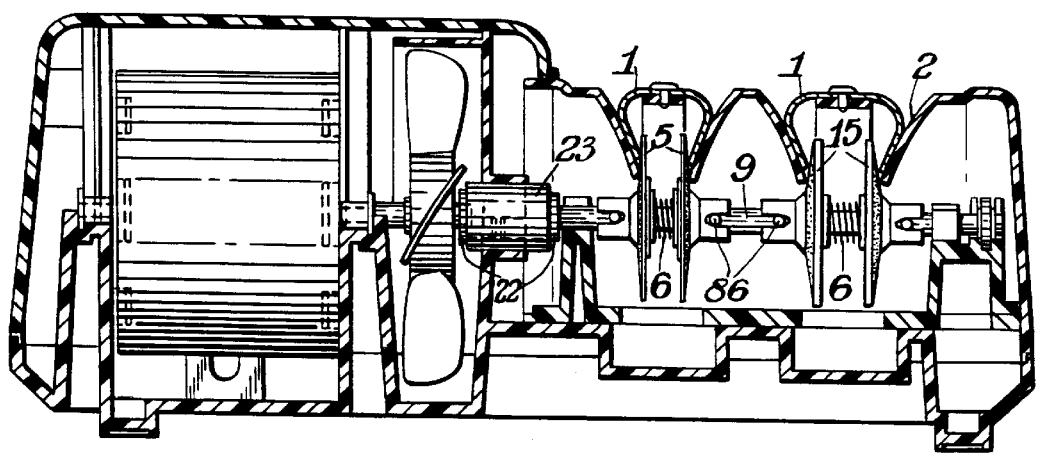

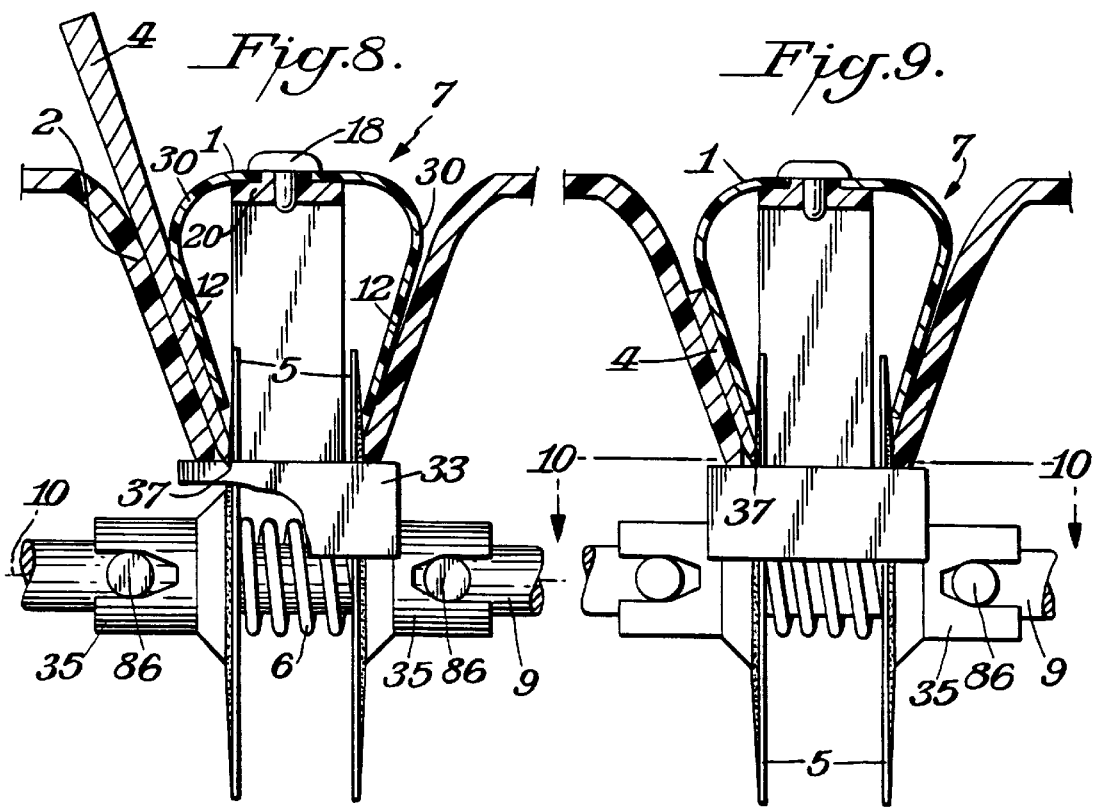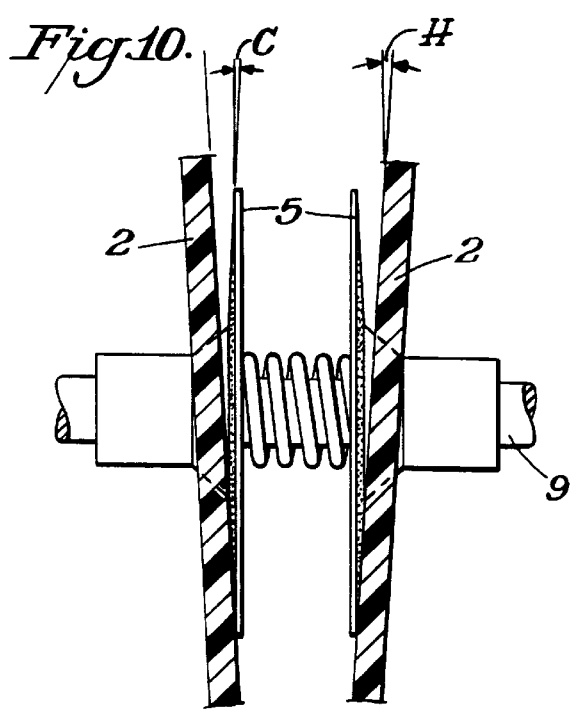

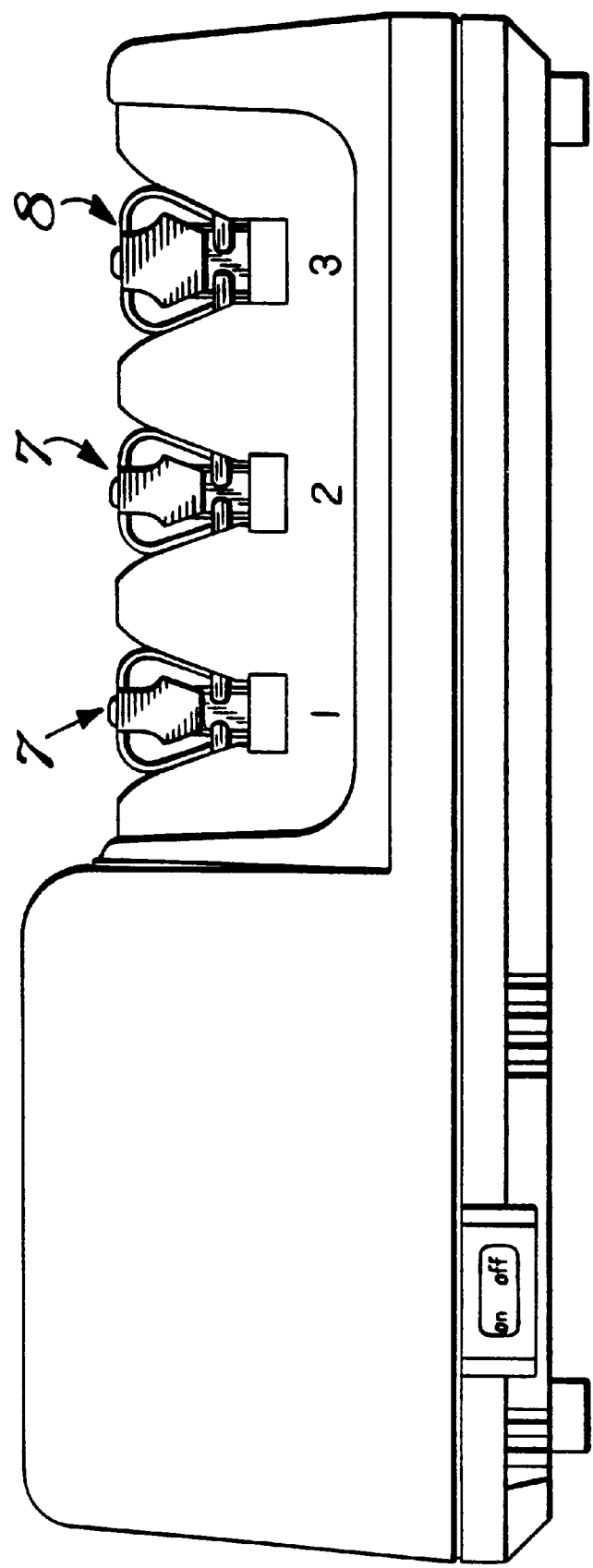

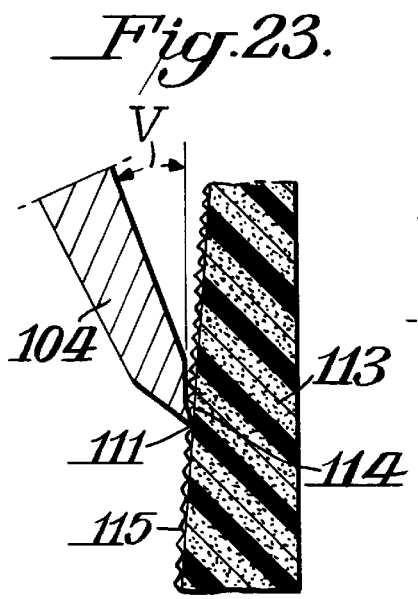
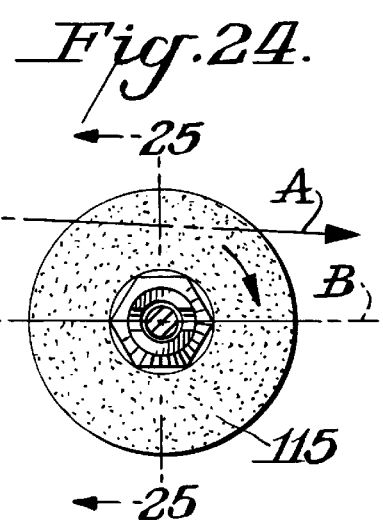
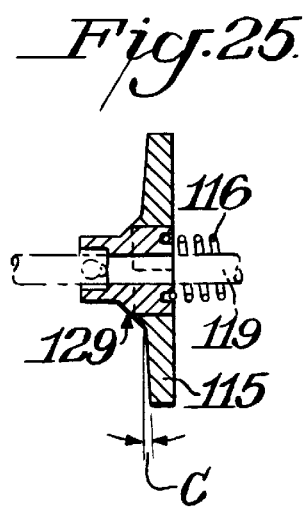
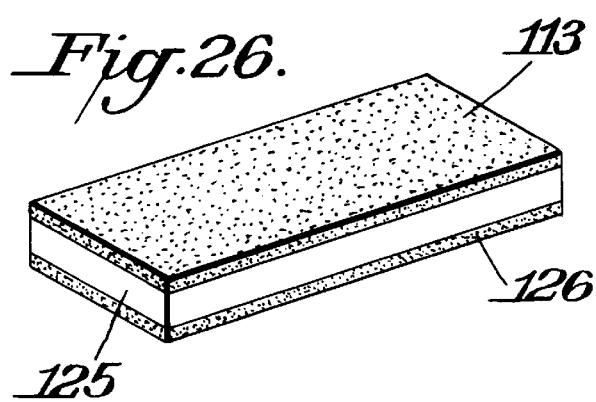
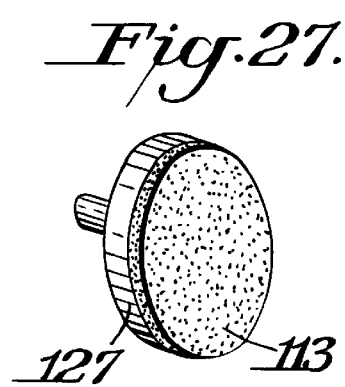
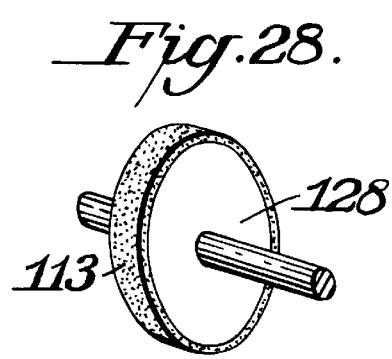

SHARPENING APPARATUS

CROSS-REFERENCE TO RELATED APPLICATION

This application is based upon provisional application Ser. No. 60/040,766 filed Mar. 14, 1997.

BACKGROUND OF THE INVENTION

The present invention relates to variations of techniques described in U.S. Pat. No. 5,611,726. Reference is also made to Ser. No. 08/889,768 filed Jul. 8, 1997 and to Ser. No. 08/466,451 filed Jun. 6, 1995, and its parent applications Ser. No. 08/391,250 filed Feb. 21, 1995, Ser. No. 08/055,856 filed Apr. 10, 1993, now U.S. Pat. No. 5,390,431 as well as U.S. Pat. No. 5,404,679. All of the details of these patents and applications are incorporated herein by reference thereto.

U.S. Pat. No. 5,611,726 ('726 patent) describes unique blade sharpeners that incorporate novel honing materials to create highly sharp yet durable knife edges. That patent described the importance of obtaining optimum physical properties of the honing material. It must have sufficient flexibility, yet when physically distorted in use it must be able to recover its original physical shape. If the honing disks are too stiff they will damage the knife edge. The grit size must be selected to be sufficiently aggressive but not so aggressive as to injure the edge.

Attempts by the inventors to use known conventional abrasive systems proved unsuccessful in attempts to reproducibly create highly sharp and durable knife edges. Successful honing requires that the material incorporating the abrasives have the appropriate physical properties, flexibility, resilience, stiffness, thermal properties and an adequate but not too high ablating rate with little to no aging of its properties.

Attempts to use conventional buffing means proved unsuccessful. Cloth and fibrous wheels tested by the inventors proved to be nonuniform and had to be recoated frequently with abrasives in order to retain their effectiveness. They are unpredictable and inconsistent. Wheels of leather and porous polyurethane materials (such as Corfam®) were impractical as they "load up" with sharpening debris and were unpredictable and inconsistent in performance.

The inventors reported in the '726 patent details of their search for materials that can be formed into precise shapes that will if distorted recover to their original shape and be homogeneous in properties. Angular control, important in knife sharpening, relies on precise shapes for the abrasive and honing materials that contact the knife edge. It was shown that a satisfactory material falls within a narrow range of physical properties for their performance.

Rubbers and polyurethanes that incorporate abrasives proved to be impractical in that they loaded-up too rapidly or that they were too tough to ablate adequately. A wide variety of epoxy-like materials proved unsatisfactory because of excessive brittleness, excessive "loading-up" and glazing over of their surfaces. They also tended to change properties with age, softened when heated or were not sufficiently flexible. However, as disclosed in the '726 patent the inventors found an optimum epoxy composition composed largely of polyoxypropylene amines which are aliphatic poly ether primary and di-and tri-functional amines derived from propylene oxide abducts of diols and triols. This material has the necessary flexibility, durability and recovery properties to make a good honing material. It has the necessary conformity as molded while maintaining the necessary abrasiveness when loaded, it has toughness, durability and adequate rubber-like properties to maintain its shape over long periods of use.

While this optimum material performs well, it must be formed into final shape by a long, tedious and expensive casting process that sets the final properties in 1–2 hours at 212° F. but requires added curing of 4 hours at 220–230° F. to stabilize its properties for a period of years.

Conventional methods of characterizing this finished epoxy material proved impractical. It was found however, that a modified Wilson Rockwell tester equipped with a special 7/8" diameter smooth steel ball did give very reproducible measurements that correlated with those properties of this material essential to its intended use for knife sharpening.

This method is described below:

The test method uses a standard Wilson Rockwell tester equipped with a 7/8" diameter steel ball to compress under the ball a sample of this material 2×2 inches and 3/8" thick first with a standard minor weight of 10 Kilograms and then with a major weight of 60 Kilograms. The ball is lowered onto the sample first under the load of the minor weight and an initial rest height of the ball is indicated as the zero point. The major weight is then applied to the ball and the distance that the ball penetrates below the zero point (change in height) is noted as $D_1$. The major weight is removed while the minor weight remains and the remaining amount of penetration is reduced. The remaining amount of depression below its original zero point is recorded as $D_2$. With this procedure a sample of the optimum epoxy material of this invention in less than 30 seconds compressed 229 divisions (0.0183 inches) on the Rockwell Hardness Tester when the major weight was applied. This is $D_1$. When that major load was removed the remaining depression $D_2$ was 140 divisions (0.0112 inches). The recovery, R, equal $$\frac{D_1 - D_2}{D_1} = 0.39 \text{ or } 39\%.$$

With all weights removed this material returned to more than 98% of its original thickness within 30 minutes. Compositions with lighter abrasive loading of the unique epoxy material recovered faster to the original thickness after this test. The recovery R as defined above and the subsequent recovery of the disks to their original shape are critically important properties for the optimum performance of these disks.

Samples representative of satisfactory compositions for the epoxy abrasive loaded disks were tested as shown below:

| Sample # | % Abrasive Solids in Epoxy 37-3EC | R % Recovery | $D_2$ Remaining* Depression (with 10 Kg) Divisions |
|---|---|---|---|
| 1 | 78% | 31 | 155 |
| 2 | 74% | 39 | 140 |
| 3 | 50% | 75 | |

*1 Division equals 0.00008 inches of Depression.

As reported in the '726 patent, this represents a relatively narrow range of properties that gives satisfactory performance using 5 micron grit. The optimum composition is in an even narrower range of 65–75% using the 5 micron grit. This demonstrates the criticality of the composition and the resulting physical properties.

The typical values stated above produced satisfactory sharpness and cutting characteristics desired by the professional chef.

Satisfactory cutting edges were produced with honing disks made by adding abrasive particles of a size within the range 1–20 microns approximately 40% to 80% by weight in the epoxy mixture. Within these ranges it is preferable to use smaller particles in the upper portion of the range of abrasive loading.

While the epoxy based composition provided the unique properties needed for good honing as described in the '726 patent, the epoxy material must be produced as described only by a slow casting process.

SUMMARY OF THE INVENTION

The inventors undertook the search for other polymer systems that would not require casting but might be processable by other means such as in an injection molding process, yet provide the unique balance of physical properties shown earlier to be essential to good honing.

Surprisingly a family of satisfactory injection moldable materials were found within the polyolefin family which is not known for toughness.

An abrasive loaded material in accordance with the invention has a recovery in the range of 30–60% with the remaining depressions being 50 to 155 divisions measured on a Wilson Rockwell Tester using a ⅞ inch diameter ball with a minor weight of 10 kg and a major weight of 60 kg.

The invention provides a honing structure for fine edge or serrated blade with adjacent facets on each side of the cutting edge. The honing structure includes a motor drive and two juxtapositioned knife guide edges set at a predetermined angle relative to a vertical line normal to the axis of rotation of one of two adjacent flexible truncated cone shaped abrasive loaded disks. The disks are driven on their axis by the motor drive to move the surface of the abrasive coated disks across and away from the cutting edge when the blade is moved into contact with the surface. The point of contact is established and controlled by the position of the knife edge guide. One guide is forward of the point of contact with each of the abrasive coated surfaces and the other guide is beyond the point of contact with each of the abrasive coated surfaces. The edges guides are positioned to engage the cutting edge. The flexible abrasive-loaded truncated cone disks contain abrasive particles in the range of 50–80% by weight in an olefinic thermalplastic resin which is based on ethylene-copolymer.

The invention also involves a stropping pad which consists of a rigid substrate covered with stropping material containing 50–80% by weight of abrasive particles in a size range of 1 to 25 microns embedded in an authentic thermoplastic resin system based on an ethylene copolymer.

THE DRAWINGS

FIG. 1 is a side elevational view of a sharpening apparatus in accordance with this invention also showing the sharpening and honing blade sections both in place and removed;

FIG. 2 is a top plan view of the sharpening apparatus of FIG. 1;

FIG. 3 is an end elevational view of the sharpening apparatus of FIGS. 1 and 2;

FIG. 4 is a cross-sectional view taken through FIG. 1 along the line 4—4;

FIG. 5 is a cross-sectional view taken through FIG. 2 along the line 5—5;

FIG. 6 is a cross-sectional view taken through FIG. 2 along the line 6—6;

FIG. 7 is a graph showing the relationship between the spring length and the force against the disk;

FIG. 8 is a side elevational view showing a large knife being sharpened in the sharpening section of the apparatus of FIGS. 1–6;

FIG. 9 is a view similar to FIG. 8 showing the sharpening of a small knife;

FIG. 10 is a cross-sectional view taken through FIG. 9 along the line 10—10;

FIG. 22 is a side elevational view of a modified form of apparatus in accordance with this invention showing plural sharpening sections.

FIG. 23 is a cross-sectional view in elevation showing a molded disk in accordance with this invention being used for sharpening a knife;

FIG. 24 is a front elevational view of a disk in accordance with this invention;

FIG. 25 is a cross sectional view taken through FIG. 24 along the line 25—25;

FIG. 26 is a perspective view of a stropping pad in accordance with this invention;

FIG. 27 is a perspective view of a molded disk in accordance with this invention; and FIG. 28 is a perspective view of a polishing wheel in accordance with this invention.

DETAILED DESCRIPTION

Figure 11:
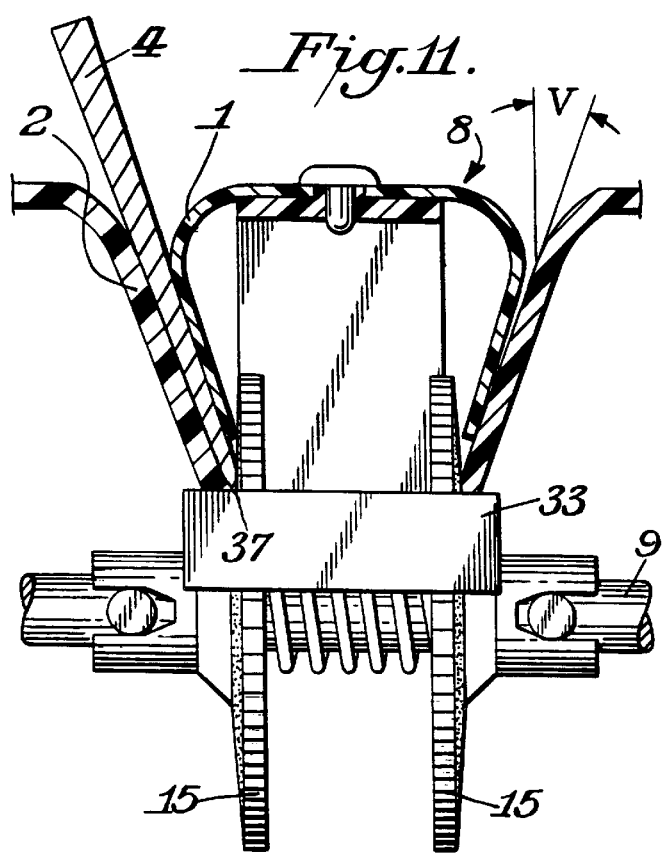
FIG. 11 is a cross-sectional view similar to FIG. 8 showing a large knife in the honing section of the apparatus of this invention.

The sharpener 36 of this invention is shown in FIG. 1 and includes a first sharpening section or stage 7 and a honing stage 8. In the sharpening stage there are two abrasive coated truncated cone shaped disks 5,5 and in the honing stage there are two abrasive loaded truncated cone shaped disks 15,15. In both stages the disks are mounted on slotted hubs 35 of FIG. 8 which are mounted on and rotated by a drive shaft 9. Pins 86 through the shaft 9 engage the slotted hubs which can slide on the shaft. Between each pair of disks is a spring 6 that provides a restraining force against the disks as they are displaced along its shaft during sharpening of the knife edge facets. The pins 9 serve to precisely locate the disk when at rest and to drive the hub mounted disks. In both the sharpening and honing stages the knife blade 4 is positioned against and along a knife guide surface to establish the sharpening angle and the knife edge is stabilized and guided by a small groove 37 cut in a tough, lubricous, and non abrasive edge guide 33, so as to establish a fixed and constant angle between the knife facet and the sharpening surface. In FIG. 1, the unique plastic hold down spring 1 generates a force to hold the knife against the blade guide surface 2. As the knife is drawn through the sharpener the knife edge cuts into and is stabilized, by the edge guide 33. Thus the knife is completely constrained in the plane of the knife guide surface as it is drawn through the sharpening stage against a rotating abrasive disk 5 of FIG. 8. The creation of a groove 37 in the edge guide 33 adds additional stability to the sharpening process but it is not essential to the operation of this invention. The blade 4 is held with adequate stability using the plastic spring 1 alone. In use to sharpen a conventional knife, the knife is pulled alternately and repeatedly through the left and right slots first in the sharpening stage and then in the honing stage until an exceptionally sharp edge is created.

The superior cutting edge formed by this invention depends upon the formation of a particular edge geometry in the sharpening stage or stages followed by a special honing action by an appropriately flexible abrasive-loaded honing disk. Both the sharpening and honing stages use cone shaped disks driven at appropriate speeds to accomplish their special functions and to create quickly an ultrasharp edge. Novel means is used in both sharpening and honing stages to stabilize the blade and control the sharpening angle. The sharpening disks 5,5 are commonly formed from metal about 1/16 inch thick in the shape of a truncated cone with its surface sloped at several degrees to the normal to the cone axis. The conical surface is coated with a layer of abrasives—preferably diamonds—that cut cleanly and with little heating.

The abrasive speed against the knife edge is controlled to eliminate blade detempering due to over-heating. The sharpening disk 5 and honing disk 15 rotate in a speed range of 1300 to 1600 rpm while the knife edge contacts the disks at a radius in the range of 0.5 to 0.9 inches, preferably about 0.75 inches. Thus, the linear sharpening speed is approximately between 750 and 400 feet per minute, well below the range of approximately 1000 feet per minute at which speed overheating could occur on the diamond coated sharpening disk 5.

FIG. 8 is an expanded view of the sharpening section showing the knife blade 4 in place between the plastic hold down spring 1 and the blade guide surface 2. The force of the plastic spring is sufficient to completely hold the knife against the knife guide surface so that the user need only pull the knife through the sharpener. As the knife is moved down toward the knife edge guide 33 it contacts the rigid rotating sharpening disk 5 and moves the sharpening disk along its axis 10 against a spring 6 toward the center of the sharpening stage until the knife edge facet physically contacts the knife edge guide 33. The edge of the knife forms a small groove 37 in the knife edge guide and becomes firmly fixed relative to the blade guide surface 2. The correct angle, defined by the angle of the blade guide surface 2 is established and maintained ±0.5° throughout the entire length of the knife blade 4 as it is drawn through the knife sharpener 36.

The point of contact and the location of the subsequent groove 37 formed by the knife edge against the knife edge guide 33 will vary depending on the thickness of the knife 4 at its edge. Once a groove 37 is formed it will secure further the edge from lateral movement. Alternatively, the groove 37 can be preformed. Importantly, the material used to construct the knife edge guide 33 is selected to be non abrasive and to have high lubricity and high toughness. Surprisingly, high molecular weight polypropylene and ultra high molecular weight polyethylene which have the necessary lubricating and toughness proved not to damage the ultrafine edges created by the honing methods described herein. These materials were shown surprisingly to improve slightly the edge quality. The guides are designed so that they can be readily inverted to expose fresh areas and to be readily replaced when excessively worn. The discovery that these edge guides 33 can be used to act as a stop and a rest for the blade 4 without damaging the edges is important in that it allows the abrasives on the sharpening disk to move away from the edge not into the edge. Any force or thrust that the moving abrasive imparts to the blade will tend to press the blade edge against this guide 33. Without these edge guides the knife would jam between the disk and the guide structure, unless the direction of disk rotation were reversed. The reverse rotation direction will create a very poor rolled edge in the sharpening section and cause the knife to cut into and destroy the honing disk.

The sharpening force is established by the displacement of spring 6 in FIG. 8 and is a function of the thickness of the blade 4 at the point of contact with the sharpening disk 5. FIG. 8 shows that a thick blade displaces the sharpening disk 5 more than a thin blade as in FIG. 9. FIG. 7 shows a typical relationship between displacement of the spring and force against the disk. The spring is designed to have an appropriate finite force at zero displacement of the disk. The preferred force range is approximately 0.6 to 1.4 pounds for both the sharpening and honing disks during the displacement of the disk of about 0.1 to 0.15 inches along the shaft.

Hold Down Spring

The hold down spring 1 of FIGS. 8 and 9 is an elongated inverted U shaped structure made of plastic such as polymerized methyl methacrylate (Lucite or Plexiglass brands for example) or a thin metal such as stainless steel. The arms 12 of the spring which are about 30–60 mils thick if plastic, extend downward from the shoulder section 30 of the inverted U shaped structure and in the absence of a knife in the sharpener rest against the lower portion of the knife guide plane 2 at the extremities of the arms as shown by the right arms in FIGS. 8, 9 and 11. When a knife is inserted between the knife guide surface 2 and the spring 1, the spring arm 12 will bend along its length as shown in FIGS. 8, 9 and 11 to conform at least in part to the shape of the blade face. The thickness of the spring material is carefully selected to bend adequately to provide conformity along the lower part of the blade face. The spring is designed so that in its normal (no knife inserted) position the end of the spring presses against the knife guide surfaces 2 providing an initial force. The spring is supported at its upper midpoint by the boss 20 of the structural support and held in position by a pin 18. More than one boss can be used along the length of the spring. The clearance between the hole in the spring 1 and the supporting boss 20 can be varied to allow the spring to tilt slightly about its horizontal axis or to move laterally in order to accommodate a greater variety of knives of different thickness and to modify the spring action and consequent forces and conformity by the spring against the knife face. Preferably the spring is designed of a length to extend along most of the length of the knife guide plane from the front to the rear of the sharpening stages. A special configuration of this spring incorporates guard sections 31, shown in phantom in FIG. 1, that to a great extent cover the front and/or rear sections of the spring opening in order to limit accidental access of human fingers into the area of the sharpening and honing disks where injury could occur. The spring 1 can be molded either to an initial shape that closely conforms as molded to the knife guide surfaces or to an initial shape that requires that the arms be sprung toward each other significantly in order to fit against the knife guide surfaces. The latter has the advantage that it gives the spring a greater holding force against the blade face when it is inserted between the spring and knife guide surface. The latter proved to be a preferred geometry for molding as the added force gave greater stability to the blade.

The plastic hold down spring 1 is distorted more by a thicker blade than a thinner blade providing greater holding force of the blade against the knife guide surface 2. The hold down spring 1 shown in FIGS. 8, 9 and 11 is held in place at the top of the spring 1 with a snug fitting pin 18 in hole 19 through a support member 20, such as a boss. For thick knives, the flexible spring will change its shape significantly as shown in FIGS. 8, 9 and 11 to accommodate the knife. With a thick blade 4 the spring 1 will conform to the face of the blade along most of the arm length and with the thickest blades the shoulder section 30 of the spring 1 will contact the blade 4 providing a portion of the hold down force. With thicker blades the spring 1 will tilt slightly or move laterally until the opening in its midpoint is pushed tightly against support boss 20. More of the spring length is involved in the process, hence increasing the hold down force.

Creating the Knife Edge:

The method used in this invention to create the knife edge establishes a durable cutting edge with sharpness better than a conventional razor in less than 45 seconds for a knife not previously sharpened by the device of this invention and in less than 20 seconds when resharpening a knife previously sharpened by the device of this invention. This is extremely fast to achieve an edge of this ultra sharpness. Typically, a knife previously sharpened by this invention can be resharpened simply by passing it through the "honing" stage 8 of FIG. 1, to recreate the original sharpness. This resharpening can be repeated up to 5 times before the user will find it necessary to "resharpen" the knife in the sharpening stage, 7 of FIG. 1.

Sharpening Stage

Figure 20:
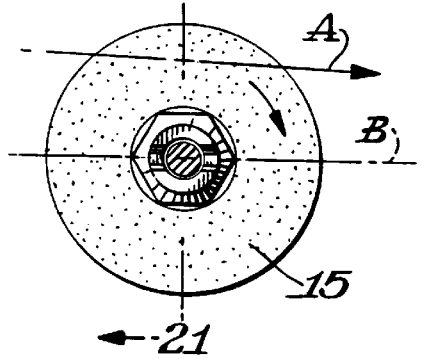
FIG. 20 is a left end elevational view of the honing disk used in the apparatus of this invention and also showing the path of movement of the knife.
Figure 21:
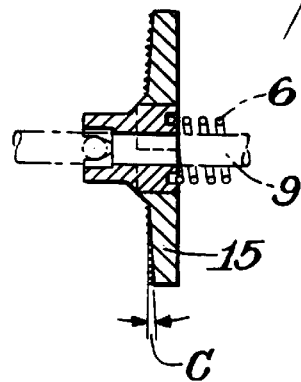
FIG. 21 is a cross-sectional view taken through FIG. 20 along the line 21—21.

Preferably the knife edge facet contacts the cone shaped sharpening disk at a point as shown along the line A of FIGS. 4 and 20 which is above the center line B of the disk a distance approximately 45–80% of the disk radius. The position of this line is selected in any event to produce nominally unidirectional grooves in the facet preferably at an angle of 20 or more degrees to the edge. (If contact were at line B along the diameter line of the disk the microgrooves would be perpendicular 90° to the edge.) The knife is guided through the sharpening stage 7 of FIGS. 1 and 8 by the knife guide surface at an angle, such that the knife edge conforms approximately to the surface of the upper forward section of the truncated sharpening disk 5 and contacts the disk in that section. In this manner the abrasive surfaced sharpening disk 5 produces essentially unidirectional microgrooves along the facet that extend to the edge and leave a microburr along the edge. The use of diamonds for the abrasive is especially desirable as it creates well defined microgrooves; other abrasives tend to smear out the grooves leaving grooves that are irregular in shape and spacing. Only the upper forward portion of the sharpening disk (FIGS. 8 and 18) contacts the knife facet. This is in contrast to teachings where the disk is flat and/or where the abrasive is moved in a direction that is into the edge.

The sharpening disk is made preferably by electroplating diamonds onto a thin metal truncated cone structure where the metal is about 0.030 inches thick. It can of course be thicker. Importantly diamonds are used as abrasives since they are extremely hard and durable and wear so little that they will maintain the shape of the conical disk on which they are plated for an extremely long time. This is in sharp contrast to abrasive stone, bonded alumina or bonded carborundum wheels that loose their shape and angular surface contour very rapidly at the point of contact with a blade in use. Such alternates will not work in a precise sharpener as described here where the angular relationships of the sharpening angle is highly critical for optimal performance and creation of the ultrasharp edge sought with this sharpener. Such solid abrasive wheels would be totally impractical for other reasons: they would heat the edge excessively, detempering the blade and create less well defined grooves across the facet. The use of diamond abrasives on a rigid substructure is essential to the optimal performance of this sharpener. The spring tension that presses the diamonds against the knife facet must be carefully chosen as described herein to optimize the sharpening rate and the groove formation.

The number of microgrooves formed in the sharpening stage along the first facets depends upon the rotational speed of the abrasive coated truncated cone disks, the abrasive grit size, the point of contact with disk, and the speed at which the user moves the knife across the sharpening disks. With the wheel speeds at 1300 to 1600 revolutions per minute and grit size of 140/170 and the point at which the knife contacts the disks, the spacing of grooves along the edge are on the order of 0.0005 to 0.005 inches apart, commonly about 0.001" apart. The burr size varies along the edge but is generally has a length less than 0.002", commonly its length is in the range of 0.0004 to 0.001 inch.

Figure 18:
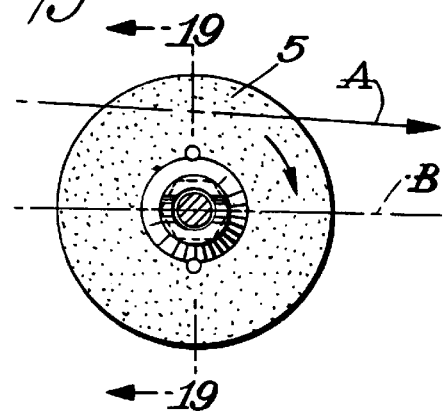
FIG. 18 is a left end elevational view of the sharpening disk used in the apparatus of this invention.
Figure 19:
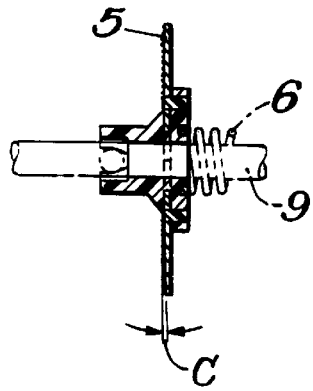
FIG. 19 is a cross-sectional view taken through FIG. 18 along the line 19—19.

The projected path A of the knife edge across the disk surface 5, in FIGS. 4 and 18 is along a chord of the truncated cone, hence the path laid out on the surface of the cone is actually curved more or less parabolic in shape. The nominal knife path as shown in FIG. 10 is angled H at typically 2–10° to the normal to the axis of rotation for the sharpening disk. An advantage of this design is that the knife contacts the abrasive cone surface more or less at a point or along a small line (approaching a point) which provides for more uniformly formed and angled microgrooves, than if the entire line of abrasives contacted the blade.

Throughout this disclosure the shape of the surface of the disk is referred to as that of a truncated cone. This is an optimal shape because it gives a surface of low curvature at the point where the knife edge contacts the abrasive. The low curvature that can be built into a low angle cone tends to extend the contact into a short line. The greater the curvature the smaller the contact line until it becomes close to a true point contact. Other curved surfaces such as large radius spheres, parabolic, elliptical surfaces, or special contours could be used. The cone shape tends to align well with the knife guide structures and allows the knife edge to contact the abrading surface near the front of the sharpener, allowing sharpening and honing closer to the handle of blades. Hence other shapes can be used in either the sharpening or honing stages although the cone is a near optimal shape.

Figure 13:
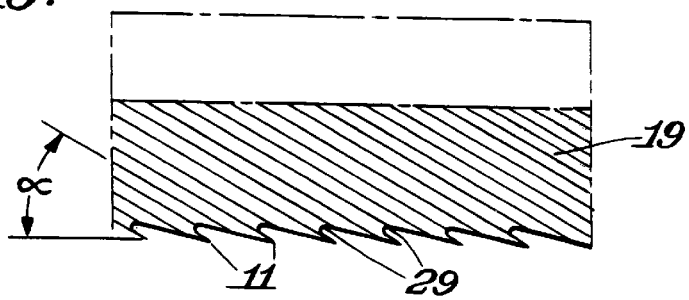
FIG. 13 is an enlarged side elevational view showing a blade facet resulting from use of the sharpening section of the apparatus of this invention.
Figure 14:
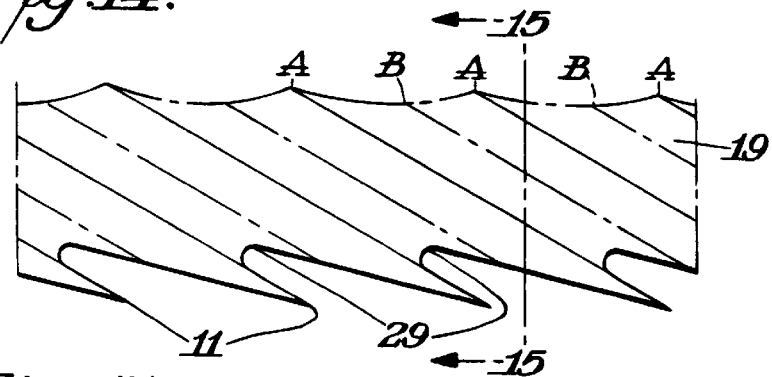
FIG. 14 is an end elevation view of the blade of FIG. 13.
Figure 15:
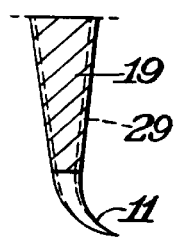
FIG. 15 is a cross-sectional view taken along the line 15—15 of FIG. 14.

In the sharpening stage or stages it is desirable to create a series of microgrooves 29 across the facets that extend to the cutting edge for example as shown in FIGS. 13 and 14. These grooves 29 are modified and sharpened further in the subsequent honing stage to create an ultra sharp edge modified to retain some of the microgrooved structure but leave an edge as in FIG. 17 that has what chefs call "bite"—that is an edge that will easily start a cut on food or other material. The character or "feel" of the knife edge can be adjusted by controlling the depth and number of grooves per inch and by the extent of subsequent honing. Depending on the selected diamond grit sizes from 100 grit to 600 grit one can create edges that "feel" substantially different under a variety of cutting applications. A grit size of 140/170 gives an edge that is preferred by many of the professional chefs. The sharpening stage is designed to form an edge with microgrooves 29 running down the facet 19 in FIGS. 13–14 to the edge, and simultaneously the burr 11 of FIGS. 14 and 15 is also formed along the edge. The word burr is used to describe an extension at the edge often inconsistent in shape that deviates from the geometric extension of a cross section of the last facet bevel angle adjacent to the edge. The burr 11 generated by the sharpening station is shown in magnified cross section in FIG. 15 and is a distorted geometric extension of the facet 19 last exposed to the grinding surface. After the burr is formed in the sharpening station 7 of FIG. 1, the knife is placed in the honing station 8 of FIG. 1, where the burr 11 comes in contact with the unique honing disk 15 of FIG. 11. The knife guide surface in the honing stage is set at a slightly larger angle to the vertical several degrees larger than that of the previous sharpening stage. In the sharpening stage each of the two knife guide surfaces are tilted back from the vertical about 15 to 25 degrees, the specific angle V of FIG. 11 being selected with reference to subsequent sharpening in the honing stage. Commonly the guide surfaces are inclined 20° to the vertical, making it possible to place a facet on each side of the edge thus creating two facets that meet at approximately 40° apart at the edge. In the sharpening stage the surface of each abrasive coated truncated cone is inclined to the normal to the cone drive axis by approximately 2–10 degrees. Commonly these are inclined 2 degrees. See angle C, FIG. 10.

It is common to incline the knife edge about 3° to the horizontal, shown as angle K, in FIG. 4 down in the front of the sharpening stage and above the horizontal in the rear to make it more comfortable to the user and to induce the user to comfortably rest the edge on the edge guide in the front of that stage. There is also an edge guide at the rear of each knife guide surface that can be used to rest and assist in guiding the blade. Further the horizontal axis of each of the knife guide surfaces (horizontal axis as used here is defined as a horizontal line lying on the face of these guide surfaces) in the sharpening stage is also tilted relative to the normal to the drive shaft axis of the truncated cone disks by an angular amount angle H, in FIG. 10 approximately equal to the angular tilt angle C, in FIG. 10 of the surface on the truncated cone 5 relative to the normal to its drive shaft axis. These angular relationships allow the angle of the blade 4 as it is guided by the knife guide surface to pass over the upper front quadrant of the truncated cone shaped disk 5 along a line that is above the center of the disk and that crosses the disk more or less parallel to a line drawn on the surface of the conical disk tilted like the knife edge angle K, in FIG. 4 some 3° from the horizontal, as shown in FIG. 4 and FIG. 18.

These complex angular relationships insure that the knife edge in both stages will contact the conical abrading surface at a point along the prescribed line A on the upper front quadrant (upper right quadrant) of FIGS. 18 and 20 of the disk. The knife edge does not contact the disk in the upper rear quadrant. Because of the ultrasharp edge created by this sharpener during honing it is critical that the knife edge be in contact with the honing wheel only at points where the surface of the honing wheel is moving away from the edge. It would be disastrous if the ultrasharp edge being formed were to contact the wheel at any point where the abrasive moved into the edge. The sharp edge would promptly shave off the surface of the honing disk and destroy both the disk and the edge being formed.

Honing Stage

Figure 12:
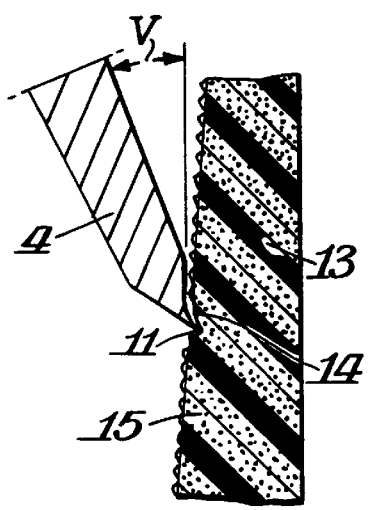
FIG. 12 is an enlarged cross-sectional view of a portion of the honing section showing the removal of a burr from the knife.
Figure 17:
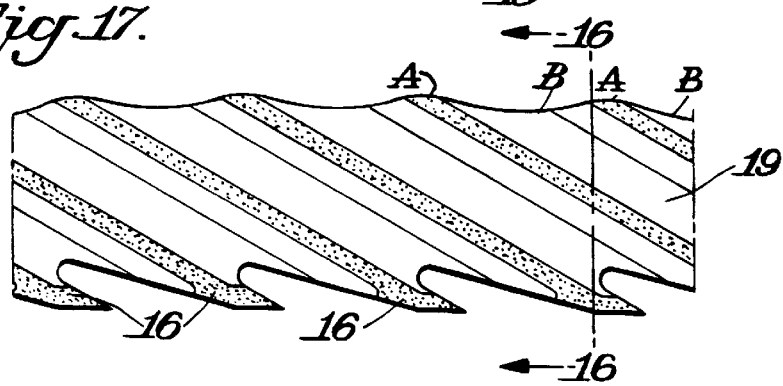
FIG. 17 is an end elevational view showing the burr removed and the edge reshaped from a knife after being honed in the honing section of the apparatus of this invention.
Figure 16:
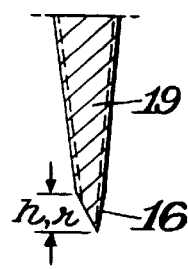
FIG. 16 is a cross-sectional view taken along the line 16—16 of FIG. 17.

The honing disk 15 is designed to flex at 14, FIG. 12, the point of contact with the burr 11. The small grain size of the abrasive particles 13, typically 5 microns, micro machine the face of the burr 11 left by the sharpening stage and with continued contact with that disk the burr will be removed leaving a small facet along the edge where the burr formerly existed. Repeated honing on both facets micro grinds the burr to create a profile 16 as for example shown in FIGS. 16 and 17. This typically leaves a new small facet whose bevel face has a height h typically on the order of 10 microns and a radius of curvature® at the edge on the order of several microns. The angle of the initial larger facets previously created by the sharpening stage is less than the angle of the secondary microfacet created by the honing disk surface. The angular relationships in the honing stage described below insure that the protruding burr will contact the honing disk first and hence be selectively removed by the localized high pressure applied by the abrasive surface. The edge shapes shown in FIGS. 13–17 are only one example of the edge serration and burr geometries that can be created depending on the abrasive size, the force of the disk restraining spring, and other variables. The groove spacing may not be as regular as shown in FIGS. 13, 14 and 17 depending on the speed and consistency with which the knife is pulled across the sharpening and on irregulation of the abrasive coating. It is not uncommon to see a longer burr on the edge after the sharpening stage that extends along the edge a distance equal to many microgrooves. With sufficient honing the burr is largely removed and an extremely sharp edge is retained with interspersed remnants of the microgrooves. A cross section elevational view, in FIG. 16 shows a burr free edge with small microfacets created by the honing disk below the main facet at the edge.

In the honing stage the knife guide surfaces are preferably tilted back angle V, FIG. 11 from the vertical several degrees more than in the sharpening stage. For example, if the vertical tilt in the sharpening stage is 20 degrees, the tilt angle V in the honing stage commonly might be about 22½ degrees. The angular range depending on the angle selected in the sharpening stages will be in the range of 17 to 27 degrees. The surfaces of the abrasive loaded truncated cone disks of the honing stages like the sharpening stage will be angled, angle C, FIG. 10, in the range of 2–10°. However for example if the sharpening stage cones are angled at 2°, it is preferable that the surfaces of the honing disks be angled at a larger angle of about 7° to the normal to the drive axis of the honing disks.

As in the sharpening stage it is preferable to incline, angle K, the knife edge about 3° to the horizontal in the honing stage for the same reasons.

However, the horizontal axis of each of the knife guide surfaces in the honing stage would be tilted relative to the normal to the drive shaft axis of the truncated cone disks by an angular amount, angle H of FIG. 10, approximately equal to the angular tilt, angle C, of the surface of the truncated cone relative to its normal to its drive shaft axis. Consequently that horizontal axis of each guide surface would be tilted about 7° for this example. It would in any event be tilted with an angle H on the order of 2–10 degrees.

These angular relationships insure the knife edge will contact the conical abrading surface at a point along the upper front quadrant (upper right quadrant) as shown in FIG. 20 of that disk, similar to the contact point on the sharpening disk.

The angle of the blade facets created in the sharpening stage will be slightly larger than the vertical angle, angle V, established by the knife guide surfaces. For example if the knife guides vertical angle is 20°, if the cone surface angle C is 2° and if the knife guides are tilted 2° in the horizontal, angle H, the angle formed on the blade facet will be between 20 and 22°, the exact angle depending on the particular location of the point of contact of the knife edge with the disk surface. Similarly in the honing stage with the knife guide surfaces at 22½ degrees to the vertical, the cone surface at 70 as defined above, and the knife guides set at 7° to the horizontal, the new small facet at the edge will be between 22½ and 29½°. However, because of the flexibility of the disk that allows the disk to distort and conform in part to the shape of the major facet established in the sharpening stage, the angle of the new small facet is more indefinite. It will in any case be larger than 20° for this example.

Referring to FIG. 15, the burr 11 that remains along the edge after the sharpening stage is a bent structure (as shown) in FIG. 15 that is bent away from the center axis of the blade in a direction away from the last side of the blade that encountered the abrasive coated sharpening disk. In FIG. 15 the burr 11 is bent to the right indicating the last abrasive coated sharpening disk surface was abrading the left facet of the edge structure shown in FIG. 15. When that blade is placed in the honing stage and the burr on the right side encounters the abrasive loaded honing disk, that disk will begin to remove the extended burr and after several passes across that disk, it is abraded back to its root. On alternate passes through the honing slot, the other honing disk abrades the other side (left in FIG. 15) of the facet creating a micro-facet there that at first will be at a slightly larger angle to the blade axis than the original facet created in the sharpening stage as described above. Because of the absence of the burr on the left side of the blade of FIG. 15, a new micro-facet will be formed by the honing disk faster on the left side of the edge than on the right side where the burr existed and consequently more metal had to be removed. However, with repeated passes of the blade through each of the slots in the honing stage, the micro-facets will be formed along each side of the edge in a reasonably symmetrical manner.

Figure 16B:
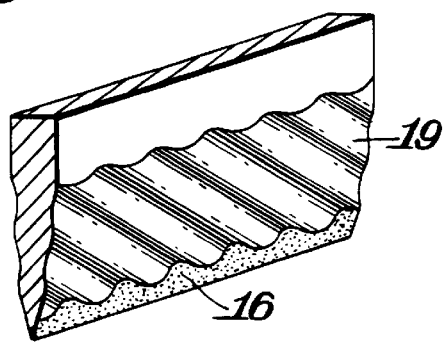
FIG. 16B is a perspective and cross-sectional view showing a finished honed blade edge in accordance with this invention.
Figure 16A:
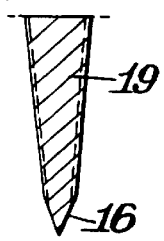
FIG. 16A is an end elevational view showing a finished honed blade in accordance with this invention.

With continued honing microfacets are first formed on the ridges of the microgrooves and subsequently microfacets will be created along the valleys of the microgrooves. At that point any edge serrations have been largely removed. FIG. 16B is a perspective view along the edge after repeated honing when well formed microfacets have been created along the sides of the edge. The line of intersection of the grooves on the first facet with the microfacet leaves a fluted structure along the facet surfaces. These flutes have sharp boundaries where they intersect the microfacets and these flutes enter into the cutting action if the food or material being cut either compresses or distorts a distance of 5 to 20 microns and comes into contact with these boundaries before severing. This novel micro structure adds to the effective sharpness and cutting ability of the "edge" and the apparent "bite" of the blade.

The method used in this invention to precisely control the geometric polishing and shaping of the burr makes it possible for the unskilled person to consistently reproduce the same high quality edge sharpness time after time. This control is achieved through the precisely formed edge geometry created in the sharpening stage or stages and, by the unique composition and physical properties of the honing disk. The flexible abrasive loaded disk, FIGS. 11 and 12, is a thicker supported truncated cone shape whose surface rotates down past the knife edge. The abrasive surface like the sharpening stage moves across and away from the edge—not into the edge. The knife blade 4 is placed between the knife guide 2 and the hold down spring 1 and moved downward as its edge makes an initial contact with the conical honing disk and until the knife edge contacts and forms a groove 37 in the knife edge guide 33. See FIGS. 8–9. Then in like fashion to the action of stage 1, the knife is firmly positioned at a fixed angle against the honing disks ±0.5 degrees and pulled successively across the left and right disks to hone the edge.

The mechanical and abrasive properties of the honing disk derives from the composition of the epoxy matrix, the solids content and particle size. A two component epoxy system is prepared with a given ratio of monomer to hardener and cured at a temperature (typically 120° C.) for a time (typically 4 hours) to give the flexibility needed. The solids content (typically 5 micron particles of aluminum oxide typically 74% by weight) and the physical characteristic such as hardness and flexibility of the epoxy matrix will determine the polishing speed and the quality of the final edge. It is important that the conical honing disk have a closely controlled flexibility, stiff enough to retain its geometry at rest but sufficiently flexible to conform to the facet face and to the mildly serrated edge structure previously created by Stage 1. This conformity insures that a gentle abrasive action takes place to remove the burr and to polish the roots of the removed burrs as shown in FIG. 16 and 17. The honing action further polishes the raised portion of the serrations along the edge.

Construction and Properties of the Honing Disks:

The honing disks 15 necessary to successfully create the ultra sharp edges as described herein must have highly unique physical properties. The disks must be only mildly abrasive in order to avoid excessive abrasion and destruction of the relatively sharp edges and the microgrooves created by the sharpening stage. The disks must, however, be sufficiently abrasive to remove the burr previously formed by the sharpening stage in a reasonably short time—for example one would like to complete the necessary honing section with only a few pulls across each of the right and left honing disks. Further the disks must be fabricated so their surfaces will not load-up with the swarf—which is the fine metal dust removed from the knife by the abrasive. It is important too that the disks not heat up excessively and that they retain adequate physical stiffness, that is not become too flexible from the heat of sharpening. It is desirable that they retain their physical properties over many years, that is the organic content should not oxidize or continue to crosslink and polymerize over its reasonable life time. If the honing disks become stiffer in time they can in use damage the edge. The grit size must be carefully selected. It has been shown that grit sizes above about 25 micron are too aggressive and injure the edge. Consequently successful honing as described in this invention requires careful selection of the organic binder, the abrasive, the abrasive size, the ratio of abrasive and organic components, the disk size, thickness and speed, and the pressure during sharpening against the knife edge. Successful honing requires that the disk have appropriate physical properties, flexibility, resiliency, stiffness, appropriate abrasiveness, that is metal removal rates, thermal properties (heat generation) an adequate but not too high ablating rate, little to no aging of its properties. Attempts to use conventional buffing means to improve the edge created by Stage 1 proved unsuccessful. Cloth wheels and fibrous wheels tend to be extremely nonuniform in their action on the edge. They must be coated frequently with a manually applied adhering abrasive which is an impractical practice for a commercial sharpener. The fabric, cloth and fibrous wheels have the major disadvantage that their nonuniform structure and nonuniform abrasive actions makes them totally unpredictable and inconsistent so that they periodically destroy the fine edge that one would like to create. Wheels made of leather and porous polyurethane materials (such as Corfram®) were impractical because they "load-up" with the sharpening debris. Hence their performance too is unpredictable and inconsistent rending them unsatisfactory for a commercial sharpener. An important advantage of the optimal compositions for the honing disks as described here is that they are homogeneous and nonfibrous, hence very uniform in composition and physical properties throughout the disk. They provide a predictable, consistent, smooth and uninterrupted action to allow precision angular honing at predictable angles with precisely and consistently the optimum angular relationship to the facet formed by the sharpening stage. The amount of pressure and effectiveness of the abrasive action for a honing disk must be the same day in and day out to provide consistently well formed microfacets and an ultrasharp edge. It is extremely easy to over abrade and destroy the edge or to have a structure that quickly glazes over and fails to sharpen at all.

The physical properties of the disks must fall within a narrow range in order to assure optimum removal of the burr formed in the sharpening stage and to form the small microfacet along the edge. A wide variety of organic materials were evaluated each with a range of abrasive particle size and content by weight. Rubber based wheels proved impractical in that they "loaded-up" rapidly and wore rapidly if loaded lightly with abrasive. When loaded with larger amounts of abrasive they abraded the edge too fast and damaged the edge. Polyurethanes noted for toughness proved too tough and did not ablate enough to expose fresh abrasive surfaces.

A wide variety of epoxy resins were evaluated with a wide range of different abrasives of different grit sizes. Only one class of epoxy proved satisfactory. The large number of commonly available and conventional epoxies proved impractical because of either excessive brittleness, excessive "loading-up" and glazing over their surfaces with the sharpening debris, tending to age and change properties with age, excessive softening as they heated during sharpening, or inadequate resiliency and flexibility.

An optimum epoxy composition was acquired from Masterbond Corporation that is composed largely of: Polyoxypropyleneamines which are aliphatic polyether primary and di- and tri-functional amines derived from propylene oxide adducts of diols and triols. This is a two part system which is mixed to create the above described chemistry. This material loaded with the proper amount of abrasive is cast into molds giving a product essentially free of strain and low in shrinkage.

This is special composition 37-3EC formulated especially for this application. It proved to have the necessary flexibility, durability, and hardness, and importantly when formulated with the appropriate quantity of abrasive it ablates fast enough to avoid "loading" and to keep fresh abrasive exposed on the surface but it does not ablate so fast that it shortens the life of the disks appreciably.

A variety of abrasives were tested. Carborundum proved less effective than aluminum oxide (alumina) in removing metal. Diamonds were effective but very expensive. The optimum grit size of aluminum oxide proved to be in the range of 5 to 12 microns. Satisfactory weight ratios of the alumina grit and epoxy were within the range of 1 to 4 parts alumina for 1 part of epoxy. Lower concentrations of abrasives were impractically slow. With higher concentrations the bonding strength of the epoxy was inadequate and cracks resulted with use. Aluminum oxide and diamonds are the preferred abrasives.

For this optimal composition of abrasive loaded epoxy the optimal disk thickness was in the range of approximately 0.08 inch to 0.125 inch at the edge of a disk two inches in diameter. This thickness gave good flexibility and conformity while maintaining the necessary abrasiveness, toughness, durability, and rubber like properties to maintain its shape over long periods of use. It softens slightly as it warms in use but not enough to interfere with its effectiveness.

The cure rate of the optimal abrasive loaded epoxy is reasonable and practical. The mixed abrasive and epoxy resin sets to its final properties in 1 to 2 hours at 212° F. but if cured for 4 hours at 220–230° F. its properties do not change significantly during the subsequent 3 years. It was found that other epoxy mixtures that cure too slowly for example over several days will continue to change their properties over years making them impractical for this application.

The physical properties of this optimal composition of abrasive and epoxy are difficult to measure by standard procedures. It has a unique combination of "hardness", compressibility, and elasticity that can, however be characterized using a conventional Wilson Rockwell Hardness Tester. A method of characterizing this unique material is described below:

The test method uses a standard Wilson Rockwell tester equipped with a ⅛" diameter steel ball to compress under the ball a sample of this material 2×2 inches and ⅜" thick first with a standard minor weight of 10 Kilograms and then with a major weight of 60 Kilograms. The ball is lowered onto the sample first under the load of the minor weight and an initial rest height of the ball is indicated as the zero point. The major weight is then applied to the ball and the distance that the ball penetrates below the zero point (change in height) is noted as $D_1$. The major weight is removed while the minor weight remains and the remaining amount of penetration is reduced. The remaining amount of depression below its original zero point is recorded as D2. With this procedure a sample of the optimum material of this invention in less than 30 seconds compressed 229 divisions (0.0183 inches) on the Rockwell Hardness Tester when the major weight was applied. This is $D_1$. When that major load was removed the remaining depression $D_2$ was 140 divisions (0.0112 inches). The recovery, R, equals $D_{1-D+hd\ 2}/D+hd\ 1 = 0.39$ or 39%. With all weights removed this material returned to more than 98% of its original thickness within 30 minutes. Compositions with lighter abrasive loading recovered faster to the original thickness after this test. The recovery R as defined above and the subsequent recovery of the disks to their original shape are critically important properties for the optimum performance of these disks. Samples representative of satisfactory compositions for the abrasive loaded disks were tested as shown below:

| Sample # | % Solids in Epoxy 37-3EC | R % Recovery Divisions | $D_2$ Remaining* Depression (with 10 Kg) |
|---|---|---|---|
| 1 | 78% | 31 | 155 |
| 2 | 74% | 39 | 140 |
| 3 | 50% | 75 | |

*1 Division equals 0.00008 inches of Depression.

There is a relatively narrow range of properties that gives satisfactory performance using 5 micron grit. The optimum composition is in an even narrower range of 65–75% using the 5 micron grit. This demonstrates the criticalness of the composition and the resulting physical properties.

The typical values stated here produce satisfactory sharpness and cutting characteristics desired by the professional chef.

Satisfactory cutting edges have been produced with honing disks made by adding abrasive particles of a size within the range 1–20 microns approximately 40% to 80% by weight in the epoxy mixture. Within these ranges it is preferable to use smaller particles in the upper portion of the range of abrasive loading.

If the abrasive solids content exceeds the upper limit, the hardness of the honing disk makes it too aggressive giving an edge less sharp than desired, while a disk softer than the lower limit will increase the time required to obtain a satisfactory edge and the disk tends to load-up and glaze-over in use.

This range of solids content and particle size of the honing disk can be used to cover a variety of applications from honing heavy shop tools to fine craft knives. The typical range cited in this application has been found to produce a knife edge that is extraordinarily sharp and because of its precise edge geometry the edge will stay sharp longer in use. Other prior art methods either leave a weakened burr along the edge or create a dull edge. The specific designs of the sharpening and honing stages in combination create a unique highly sharp yet durable edge.

Other

A further object of this invention is to provide a unique multistage sharpener that will meet the sanitary requirements of a professional kitchen by permitting the sharpening portion 24 (including sharpening and honing stages) of the device to be easily and quickly removed for cleaning. FIG. 1 illustrates how this is accomplished. The entire sharpening section 24 may be disengaged from the motor drive section 25 by pushing the release button 26 (FIGS. 3 and 6) and sliding the sharpening section 24 away from the motor section, as shown in phantom. An automatically engaging and disengaging coupling 23 of suitable structure may be used, in part attached to the motor drive section and in part to the sharpening section, coupled for example by a splined rubber connecting sleeve. This sort of a flexible splined coupling compensates for as much as 1/16 misalignment between the sharpening section and the motor section. As shown in FIG. 5 the flexible coupling 23 and the splines 22 affixed to both the motor/drive shaft and to the shaft of the sharpening portion 24 engage and disengage slidingly. Release button 26 is spring biased for engagement/disengagement with a pawl 21 as shown in FIG. 6. Both the sharpening and honing disks and knife blade guides are attached to a common rigid supporting structure within the entire sharpening section 24 so that their relationship is undisturbed when the sharpening section is periodically removed for cleaning and then replaced in position to the motor drive section.

It is to be understood that although the invention has been particularly described with respect to a single sharpening section and a single honing section, the invention may also be practiced where there is more than one sharpening and/or honing sections. FIG. 22, for example, illustrates a sharpener having two sharpening sections 7 and one honing section 8. Where more than one section is used the angles should progressively increase from one section to another.

As described above, and as illustrated, each of the truncated cone shape abrasive loaded disks has an abrasive coated outer surface. The disks are driven on their axes by the motor drive to move the outer surface of each disk across and away from the cutting edge when the blade is moved into contact with the outer surface of each disk. The point of contact is established and controlled by the position of the knife edge guides with one guide being forward of the point of contact with each of the abrasive coated outer surfaces and with the other guide being beyond the point of contact with each of the abrasive coated outer surfaces. This results from the guide surfaces being juxtapositioned to the rotating disks with each guide surface set at a predetermined vertical angle relative to a vertical line normal to the axis of rotation of one of the disks.

What the inventors have discovered is a unique group of materials that can be heavily loaded with suitable abrasives yet surprisingly can be injection molded to create another novel honing and stropping material. This same material was shown to have a wide range of applications including use in sharpening apparatus and polishing of metallic, crystalline, ceramic and semiconductor materials.

A wide range and variety of injection moldable materials including high molecular weight polyvinyl alcohols, ethylene vinyl acetates, polyvinyl chlorides, copolyester elastomers and urethanes were investigated but found to be either too rigid, too rubbery, not abatable, or easily glazed over in use. Unexpectedly certain polyolefin elastomers when loaded with 50 to 80% abrasive maintained sufficient elasticity yet were sufficiently ablative to function well as honing materials. One polymer of this class is Engage®—an ethylene alpha-olefin polymer—available from DuPont-Dow elastomers. Olefinic thermoplastic resin based on such ethylene copolymers and loaded with a range of abrasive loadings as described proved to be very effective and exhibited properties as determined by the Wilson Hardness tester method as described above that were essentially a duplicate of those created with the castable epoxy materials disclosed earlier.

Although loadings of 50 to 80% function reasonably well, the optimum abrasive-loaded olefinic material had the following composition and properties as determined by the Wilson Hardness tester.

| % Abrasive Solids in Olefinic Material | $D_1$ (60 Kg) Divisions | Remaining Depression (with 10 Kg) $D_2$ Divisions | % Recovery R |
|---|---|---|---|
| 76% | 217 | 147 | 32% |

This optimum material like the epoxy (described in the '726 patent) returned to more than 98% of its original thickness within 30 minutes after the load was removed. It molded well in a standard injection molding machine and performed well in the honing disk configuration described in the parent application.

Further it was found that materials of this composition are sufficiently flexible and abrasive that it performed surprisingly well as a manual stropping material when molded as a flat plate. In order for a material to function well as a manual stropping pad it must be flexible enough to partially conform to the knife edge but not be so rigid that it tends to "wipe out" the edge as it is pulled across the pad surface. In a manual stropping operation, there is usually little or poor control of the stropping angle and conformity of the angle of the blade edge to the stropping pad can only be adequately achieved if the stropping pad surface is flexible enough and soft enough to conform at least in part to the edge geometry. The pad must however be sufficiently abrasive to remove any micro burr running along the blade edge and to provide a residual polish to the edge facets. Surprisingly this injection moldable olefinic material performs well as tested in a range of stropping pad constructions.

Because this unique material can be molded into shapes and formed in conventional injection molding equipment, even though it is heavily loaded with abrasive, it can be molded readily into very flat plates. It is possible also to insert mold the material around or over metal plates and rigid shapes that act as a rigid support for this flexible material. By this means the general conformity shape or planarity of the surface can be established and maintained while the material has sufficient flexibility to conform locally in part to delicate knife edges as they are stropped across the surface. This conformity is illustrated in FIG. 23.

It was shown further that these abrasive loaded materials with 50 to 80% abrasive performed well for polishing crystal surfaces, ceramics, and semiconductor materials. The material is easily injection molded as flat pads, shaped into wheels and disks, or insert molded over rigid mandrels as honing or stropping wheel and axially driven rotating disks.

In FIG. 23, this novel material 113 for disk 115 is used to place an ultrasharp edge on a knife 104 which has a burr 111 along its edge which is shown deforming the abrasive loaded material 113 as shown at location 114. The knife is commonly held approximately at a slightly larger angle than the facet angle V (FIG. 23) so that the facet rests in part on the face of the material. In honing and stropping operations only light pressure need be applied to the knife edge as it is moved across or along the surface of the stropping material 113.

When used in the powered sharpener described in the '726 patent this new material is preferably insert molded onto a hub-like substrate structure 129 made of plastic or metal into cone shaped disks 115 or similar geometries as shown in FIG. 24. The disk can be molded over the hub-like structure or it can be premolded and attached otherwise by adhesive or clamping means. Spring 106 provides a restraining force against disk 115 on shaft 109. Preferably the knife edge facet contacts the cone shaped disk 115 at a point along the line A above the center line B and in the upper right quadrant of the disk. FIG. 25 shows the cone angle C. The disk 115 and FIG. 25 is used as described in the '726 patent.

In a manual stropping pad such as shown in FIG. 26 this new material 113 is secured to or molded onto a rigid metal or plastic plate 125, generally flat, which can take any of a variety of shapes for special applications. If plate 125 is flat the general surface conformation of the honing material 113 can also be flat as preferred in most stropping applications. If desired the support plate can be surfaced also on its underside 126 with a second abrasive material of the same composition or it can be coated with a more aggressive abrasive such as larger particles or diamonds to act as a sharpening "stone" that can be a useful companion to the stropping material in order to permit sharpening before stropping.

This new material has been successfully formed into polishing pads and polishing disks for semiconductors, crystalline materials and the like. For use with semiconductors and crystalline materials a variety of abrasives such as alumina, diamonds, earth oxides can be used depending on the nature of material being abraded. FIG. 27 shows one configuration where this new material can be injection molded into disk form that then is adhesively attached to a rigid disk 127. The material 113 can also be attached to a rigid disk by an insert molding process. Where desired the material can be attached by these means to flexible supporting disks and structures. FIG. 28 illustrates this material 113 molded or applied over the circumference of a polishing wheel 128.

What is claimed is:

1. In a method of making a sharpening member, the improvement being in applying or attaching an abrasive material to a substrate structure, and the abrasive material containing 50–80% by weight of abrasive particles in an olefinic thermoplastic resin system which is based on ethylene copolymer.

2. The method of claim 1 wherein the abrasive particles are in the range of 1 to 25 microns.

3. The method of claim 1 wherein the support is a rigid substrate and the abrasive material is a stopping material so as to create a stropping pad.

4. The method of claim 1 wherein the abrasive material is used for polishing and finishing materials selected from the group consisting of crystalline materials, ceramics, silicon and semi-conductor wafers.

5. The method of claim 1 wherein the abrasive material is formed and shaped by an injection molding process.

6. The method of claim 1 wherein the abrasive material is injection molded over a rigid insert.

7. The method of claim 1 wherein the abrasive material is molded over a rigid wheel or disk inserted in the mold.

8. A honing, stropping and polishing abrasive-loaded material for abrading the edge of knives, fine edge or serrated tools, and surfaces of metals, crystals, ceramics and semiconductors where the said material has a Recovery R in the range of 30–60% and whose remaining depression is 50 to 155 divisions measured on a Wilson Rockwell Tester using a $\frac{7}{8}$" diameter steel ball with a minor weight of 10 Kilograms and a major weight of 60 Kilograms.

9. A honing structure for fine edge or serrated blades with an elongated cutting edge and with facets adjacent to the cutting edge comprising a motor drive for rotating two flexible truncated cone shaped abrasive loaded disks, each of said disks having an abrasive coated outer surface, two juxtapositioned knife guide surfaces each set at a predetermined vertical angle relative to a vertical line normal to the axis of rotation of one of said two adjacent flexible truncated cone shaped abrasive loaded disks, said disks being driven on their axis by said motor drive to move said outer surface of each of said abrasive loaded disks across and away from the cutting edge when the blade is moved into contact with said outer surface, the point of said contact being established and controlled by the position of knife edge guides with one guide forward of the point of said contact with each of said abrasive coated outer surfaces and the other guide being beyond the point of contact with each of said abrasive coated outer surfaces, said knife edge guides being made of a tough and non-abrasive material that is imprinted by the cutting edge, said edge guides positioned to engage said cutting edge, and said flexible truncated cone abrasive loaded truncated cone disks containing abrasive particles in the range of 50–80% by weight in an olefinic thermoplastic resin system which is based on ethylene copolymer.

10. The honing structure according to claim 9 wherein said disks contains 50–80% by weight of abrasive particles in the range of 1 to 25 microns embedded in the said olefinic thermoplastic resin system.

11. A stropping pad consisting of a rigid substrate covered with a stropping material containing 50–80% by weight of abrasive particles in the size range of 1 to 25 microns embedded in an olefinic thermoplastic resin system based on an ethylene copolymer.

12. An abrasive material for polishing and finishing of crystalline materials, ceramics, silicon, and semiconductor wafers consisting of an olefinic thermoplastic resin system based on an ethylene copolymer loaded with 50–80% by weight of abrasive particles.

13. An abrasive material according to claim 12 where said abrasive loaded olefinic thermoplastic resin based on an ethylene copolymer is formed and shaped by an injection molding process.

14. An abrasive material according to claim 12 where said abrasive loaded olefinic thermoplastic resin based on an ethylene copolymer is injection molded over a rigid insert.

15. An abrasive material according to claim 14 of where said abrasive loaded olefinic thermoplastic resin based on an ethylene copolymer is molded over a rigid wheel or disc inserted in the mold.

16. A flexible abrasive disk for blade sharpening consisting of abrasive particles in the range of 50 to 75% by weight in a polymeric resin system that has a recovery in the range of 31 to 75% and a remaining depression of 140–155 divisions as measured on a Wilson Rockwell Test using a $7/8$" diameter steel ball with a minor weight of 10 kilograms and a major weight of 60 kilograms.

* * * * *